G. H. BEATON.
WIND SCREEN.
APPLICATION FILED APR. 14, 1909.
936,853. Patented Oct. 12, 1909.
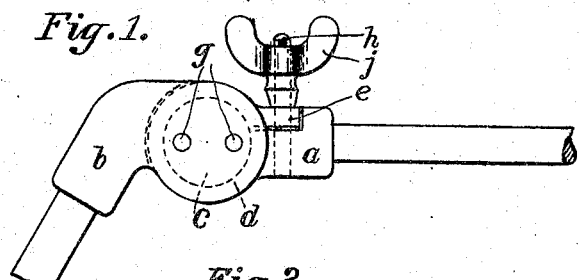
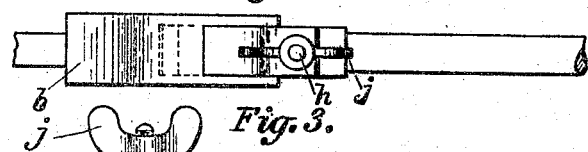
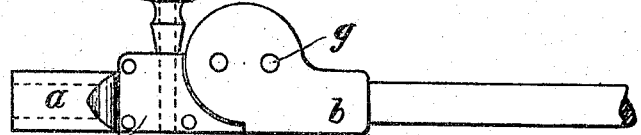
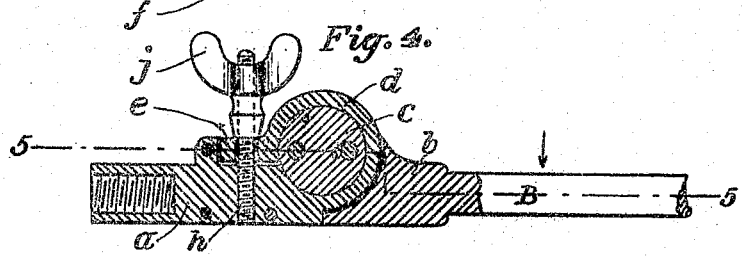
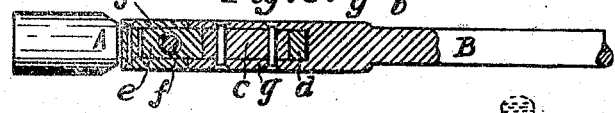
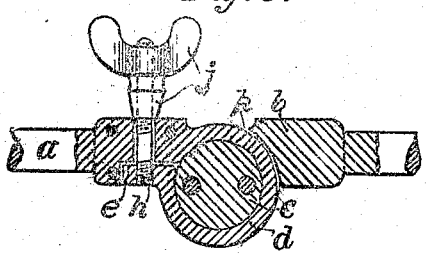
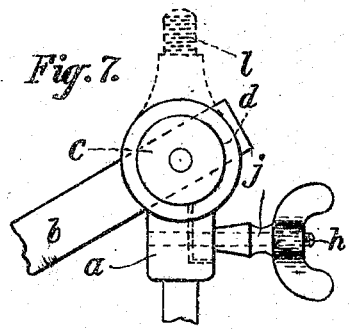
George Howard Beaton, Inventor

UNITED STATES PATENT OFFICE.

GEORGE HOWARD BEATON, OF LONDON, ENGLAND.

WIND-SCREEN.

936,853.  Specification of Letters Patent.  Patented Oct. 12, 1909.

Application filed April 14, 1909. Serial No. 489,860.

*To all whom it may concern:*

Be it known that I, GEORGE HOWARD BEATON, a subject of the King of England, and a resident of London, England, have invented certain new and useful Improvements in Wind-Screens, of which the following is a specification.

This invention relates to means for securing the movable joints in the framework of wind screens for motor vehicles and the like which shall be simple and easy to loosen and fasten, but which at the same time shall be secure and firm when fastened, and consists of a split eye on the end of one member of the joint adapted to be tightened on to the periphery of a short cylinder secured in the slotted end of the other member.

In one way of carrying out this invention one part of the joint consists of an eye formed integrally with the arm and split so that it can be tightened up. The other part of the joint has a slot at the end of the arm that fits over the end of the eye. A short cylinder a working fit in the said eye when opened out is placed in the eye and the eye is inserted in the slot and secured to the slotted part. A bolt may pass axially through the joint. When the split eye is tightened up the diameter of the eye hole is reduced, thereby gripping the before mentioned short cylinder firmly and thus the joint is locked firmly in any desired position. The eye piece may be at an angle to facilitate splitting of the bearing and to prevent weakening of the arm and also to give any desired offset. The joint parts may be vice versa and one side of the slotted part may be omitted.

Referring to the accompanying drawings Figure 1 shows a side elevation of a simple form of my invention, Fig. 2 is a plan of the same, Figs. 3, 4 and 5 are respectively side elevation and vertical and horizontal sections, of another form of the device. Fig. 4 being a vertical section, and Fig. 5 a horizontal section taken on the line 5—5, Fig. 4. Fig. 6 is a sectional elevation of a form of the device in which greater angular movement is possible, and Fig. 7 shows the invention as applied to a swinging screen top.

In the form shown in Figs. 1 and 2, the joint is virtually a knuckle joint comprising the jaw part $b$ and eye part $a$. The latter is hollow and split to form a tongue $e$ so that it can be contracted on to its pivot pin. This pin $c$ is of large diameter and is riveted between the jaws $g$.

In the form shown in Figs. 3, 4, and 5 suitable for the first or lower joints of wind screens which are attached to the ends A and B, the former being hollow and threaded, the tongue $e$ is cut rectangularly as shown, and side plates $f$, cut concave to clear and abut against the sides $g$ are riveted on, thus protecting the clearance of the tongue from becoming clogged, and also preventing injury to the fingers.

In cases where a greater range of movement is required as in the upper joints of screens the form shown in Fig. 6 is used. The center of the joint is in the same line with two edges of the joint members, which can consequently come close together. A gap $k$ is cut at the other side of the joint to allow of movement that side of the straight line. The screw $h$ is fixed in the tongue $e$ and passes through a clearing hole in the body $a$, the nut $j$ being on the side in which is cut the gap $k$.

For the pivots of swinging screen tops the form shown in Fig. 7 is used in which the pivot or plug $c$ is secured to the side frame of the swinging screen, the eye part $a$ constituting the fixed standard. For landaulettes and other cars having fixed canopies the screwed projection $l$ is formed on the eye $d$, screwing into a socket on the underside of the canopy.

Having now particularly described and ascertained the nature of my said invention and in what manner the same is to be performed, I declare that what I claim is:—

1. A joint for wind screens, comprising: a joint member, and a split eye at one end of same; a second joint member slotted at one end, said slotted portion fitting over the said split eye; a short cylinder or plug secured to the said second joint member, and surrounded by the said split eye; and means to tighten up the said split eye to grip the periphery of said cylinder.

2. A joint for wind screens, comprising: a joint member, and a split eye integral therewith at one end of same; a second joint member slotted at one end, said slotted portion fitting over said split eye; a short cylinder or plug, surrounded by said split eye, and suitable rivets to secure the same to said second joint member; and a screw passing through said split eye and held in said first joint member, and thumb nut on said screw and bearing against the said split eye to tighten up the same to grip the periphery of said cylinder.

Signed at London, England, this 26 day of March, 1909.

GEORGE HOWARD BEATON.

Witnesses:
F. L. RAND,
H. V. JAMESON.